June 24, 1924.

J. O. LUTHY

SECONDARY BATTERY

Filed Feb. 14, 1921

Inventor:
Joseph O. Luthy
by Chas. J. O'Neill
Atty

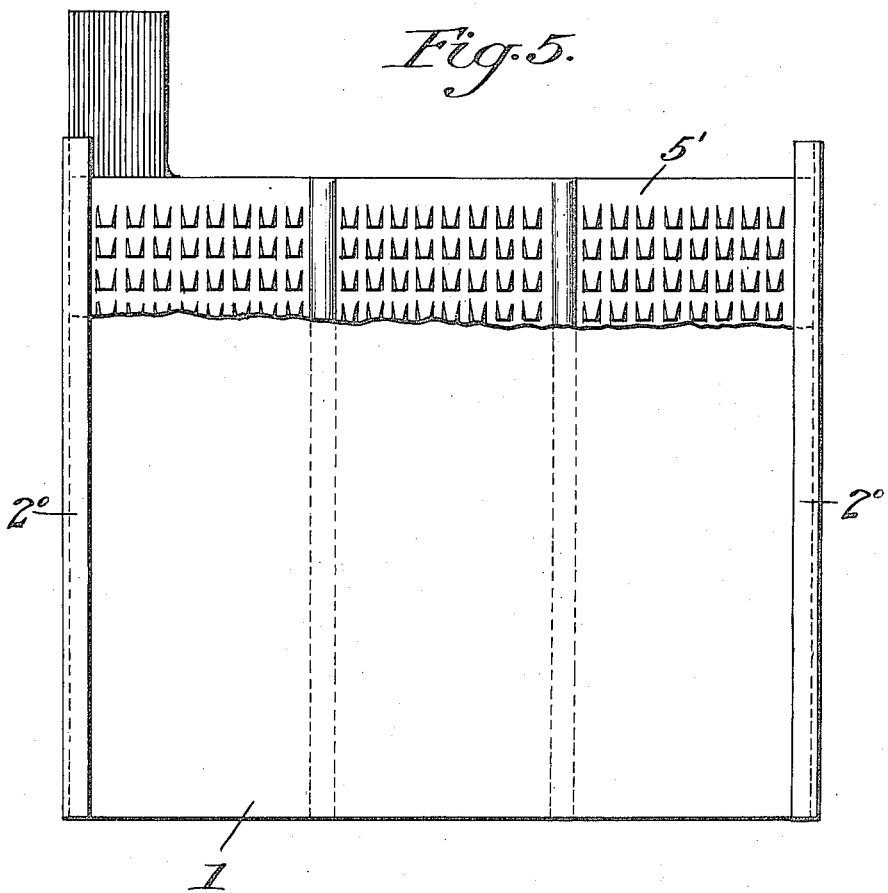
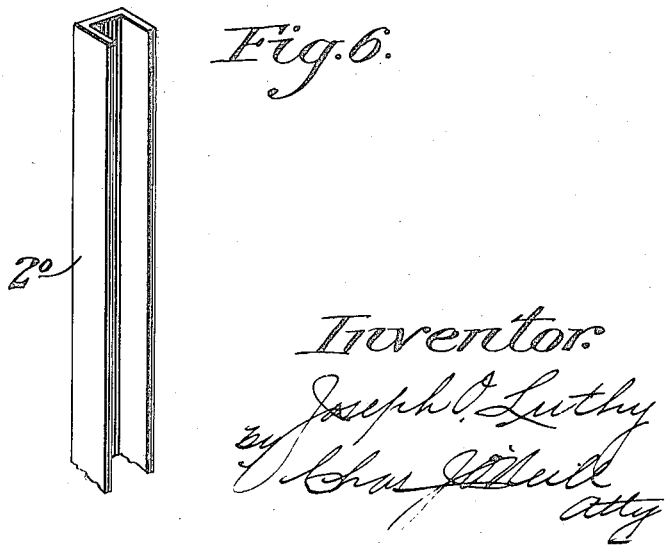

Inventor:
Joseph O. Luthy

Patented June 24, 1924.

1,498,561

UNITED STATES PATENT OFFICE.

JOSEPH O. LUTHY, OF SAN ANTONIO, TEXAS.

SECONDARY BATTERY.

Application filed February 14, 1921. Serial No. 444,802.

*To all whom it may concern:*

Be it known that I, JOSEPH O. LUTHY, a citizen of the United States, residing at and whose post-office address is #120 Essex Street, San Antonio, county of Bexar, State of Texas, have invented certain new and useful Improvements in Secondary Batteries; and I do hereby declare the following to be a full, clear, and exact description of the invention, such as will enable others skilled in the art to which it appertains to make and use the same.

The invention relates to improvements in secondary batteries and has for its object to provide a materially simplified form of plate guard and separator, which may be effectively employed in connection with standard plates as well as with the plates of special form, the parts being so associated that the separator or spacing members are locked in position on the individual plates by means of channel-like guards, which embrace the lateral edges of the plates and clamp the edges of the separator members thereto. The invention further contemplates the provision of a special form of plate, which is corrugated in cross section in such manner that the corrugations of the adjacent plates are nested together; thereby materially increasing the effective surface of the plates without reducing the number of plates which may be employed in a cell of a given size, each of the corrugated plates being provided with a sheath or envelope formed by the pervious separator sheets and the clamping channel bars which secure the latter to the faces of the plates.

The invention is illustrated in the accompanying drawings, in which:—

Fig. 5 is a view similar to Fig. 1 showing a plate provided with a separator of foraminated celluloid or like thin sheet material, secured to the faces of the plate by the channel-shaped guard members;

Fig. 6 is a fragmentary perspective view of one of the guards;

Figure 3:
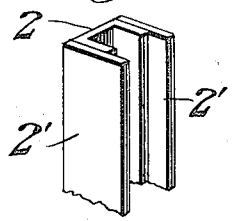
Fig. 3 is a fragmentary perspective view of one of the channel-shaped clamping guards.
Figure 4:
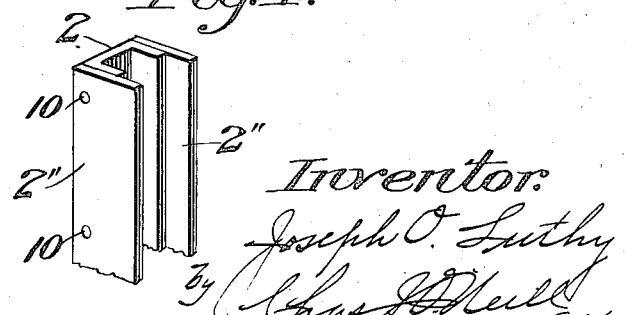
Fig. 4 shows a modified form of the guard.

Referring to the drawings, 1 indicates a secondary battery plate, of standard form, and consisting of the usual gridded frame of lead filled with the active material. Overlying the respective faces of the plate are separator members 5, 5, which may be made of thin sheets or slabs of wood or other pervious material. In order to prevent warping or buckling of the sheets it is preferable to make them of less width than the plate, and, as indicated, each face of the plate is covered by two sheets 5, 5, which are secured at their outer edges to the plate by means of channel-shaped bars 2, which embrace the edge of the plate and serve to clamp the contiguous edge of the separator sheets 5, 5 to the plate. In the form illustrated in Fig. 1, each of the said clamping guards 2 includes a channel-like member provided with two flange-forming sections of relatively thinner material 2' attached to the lateral faces of the channel-like member. Said channel-like member is adapted to snugly fit the lateral edges of the plate proper and the flange members 2', 2' overlie the adjacent edges of the separator slab or sheet 5 and clamp the latter to the plate. The clamping guard members 2 are preferably made of suitable plastic material such as celluloid, hard rubber, or the like. The flange members may either be cemented to the channel members as indicated at 2', 2' in Fig. 3, or said flange members may be secured to the channel bars by means of studs or pins 10, engaging registering holes in the flange and channel members respectively as indicated in Fig. 4.

Figure 1:
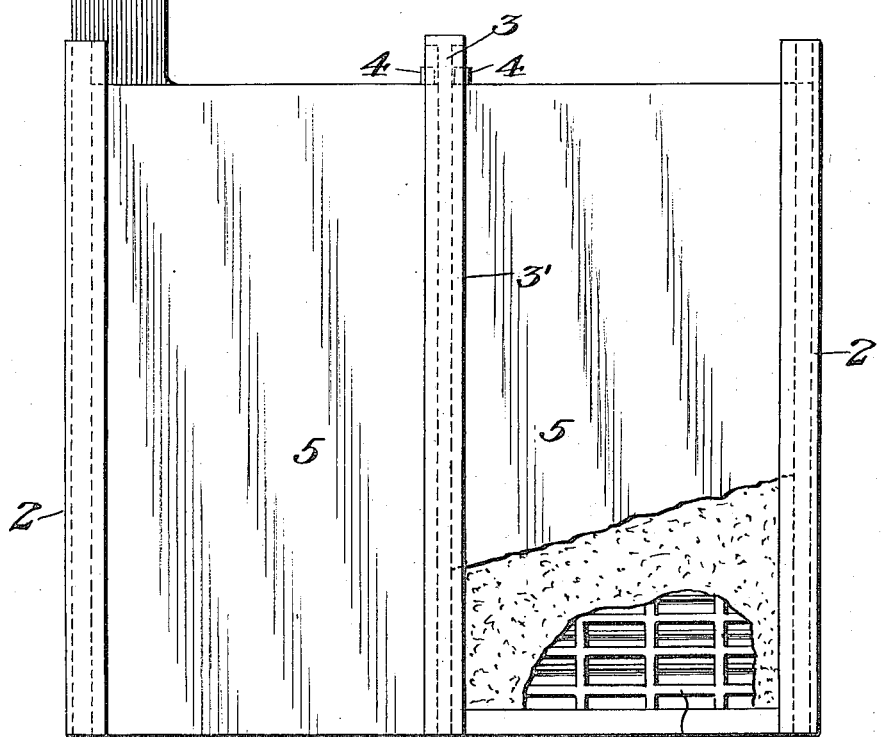
Fig. 1 is a front elevation of a plate having separators of wood or similar material secured thereto by the clamping guards.
Figure 2:
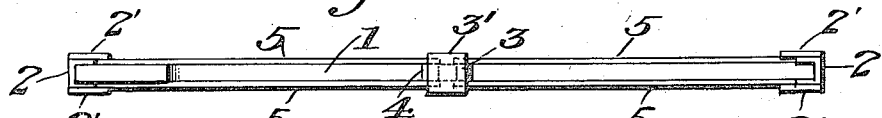
Fig. 2 is a plan view of the plate.

The inner edges of the separator sheets or slabs 5, 5, are clamped to the plate by means of a generally U-shaped guard or separator member disposed midway of the plate, held in position at the top by means of two special lugs 4, 4 formed on the upper part of the plate frame, said U-shaped member having face flanges 3' which overlie the edges of the separator members 5, 5, as clearly shown in Figs. 1 and 2. This intermediate guard and clamp member is preferably made of the same material as the end clamps 2.

In many instances it is found desirable and preferable to use foraminated sheets of celluloid or similar material as separators between the various plates of the secondary battery and such an arrangement is shown in Fig. 5 in which the plate 1 has each of its faces covered by a separator 5' formed of a sheet of celluloid or similar plastic material having multiple holes or foraminæ therein, the edges of the separator members 5' being clamped securely to the plate by means of channel-shaped bars 2°, which engage the edges of the plate and serve also as spacing members between adjacent plates. In this particular form of clamping bar the side flanges of the bar serve the double function of clamping the separator members to the plate and also of locking the bar, which acts as the guard and spacing member between the plates, to the vertical edges of the plate.

Figure 7:
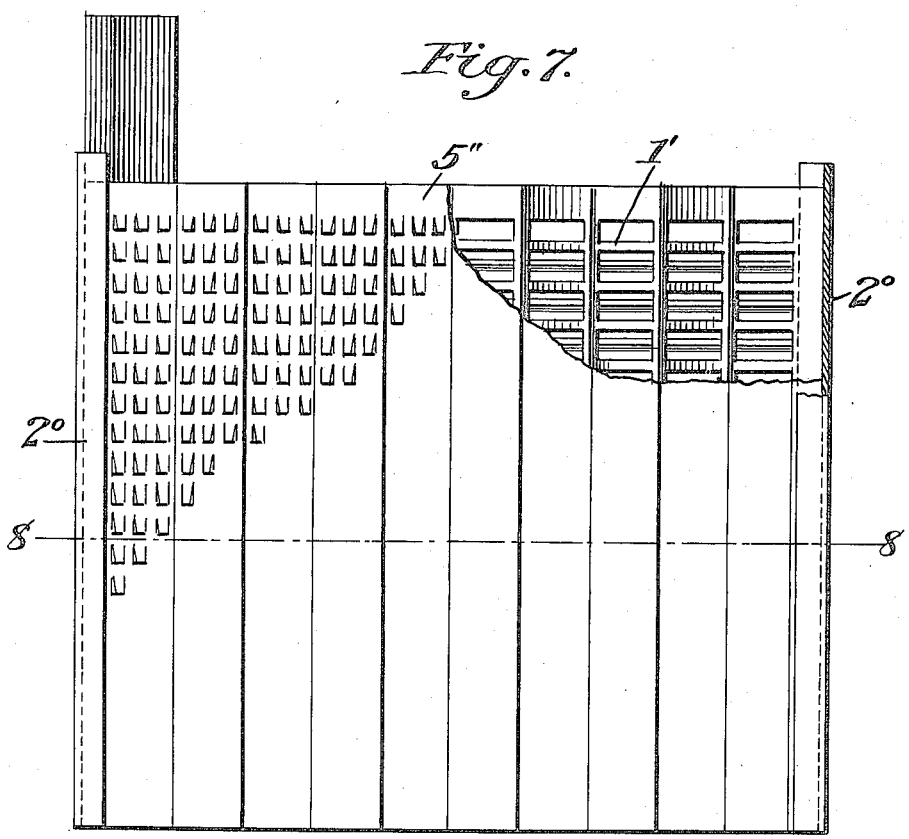
Fig. 7 is an elevation, partly in section, of a corrugated plate having the invention applied thereto.
Figure 8:
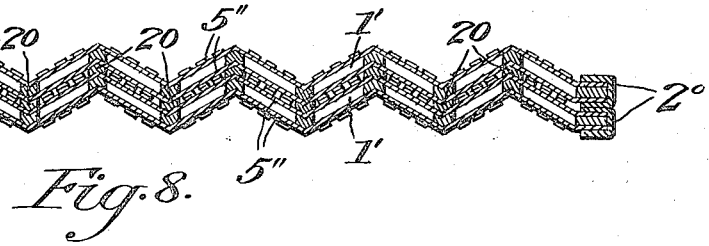
Fig. 8 is a section on line 8, 8 of Fig. 7 showing two of the corrugated plates in nested relation.

It is highly desirable to increase the surface of the active material of each battery plate, as far as possible, without commensurately increasing the dimensions of the plate. This has been effected by the means shown in Figs. 7 and 8, in which each of the plates is formed with a series of zigzags or corrugations, extending from top to bottom, the corrugations being so disposed that when two plates are brought side by side the corrugations will nest one within another, thereby enabling the plates to be brought as closely together as if they were formed with relatively plain sides, and permitting a relatively large number of plates being assembled within a given cell. It has been proposed heretofore to employ secondary battery plates having a generally corrugated surface, but in no instance have the plates been so constructed that the corrugations are capable of nesting together or interfitting so that a substantially uniform distance may be obtained between adjacent plates, throughout the entire surface area.

With this particular type of plate each surface is covered by a separator sheet 5" which is correspondingly corrugated and therefore conforms closely to the contiguous surface or face of the plate. These separator plates 5" are locked to the battery plate, by means of U-shaped clamping bars 2°, engaging the lateral edges of the battery plate as illustrated and serving as primary spacing or distance members between adjacent plates. In order to reduce or obviate local action between the vertical metallic elements of the plate grid, which are located at the angles, there are provided separators 20 in the form of V-shaped strips of celluloid, hard rubber, or similar plastic material, which also serve as spacing members between adjacent plates.

It will be noted that in each of the various modifications of the invention the pervious separator elements, whether the same be in the form of subdivided slabs of wood or similar material, or continuous sheets of foraminated celluloid or the like, the guard members are effectively secured to each face of the plate by the simple expedient of the channel-shaped clamping bars which firmly engage the lateral edges of the battery plate, and serve the further purpose of guarding the metallic edges against local action and also spacing the battery plates at proper intervals.

What I claim is:

1. A sheath or envelope for secondary batteries comprising sheets of pervious material overlying the faces of the plate and channel-shaped bars embracing the lateral edges of the plate and clamping the sheets thereto.

2. A sheath or envelope for secondary batteries comprising sheets of pervious material overlying the faces of the plate and channel-shaped bars embracing the lateral edges of the plate, said bars having flange-forming sections secured to the sides thereof serving to clamp the sheets to the plate.

In testimony whereof I affix my signature.

JOSEPH O. LUTHY.